US006412859B1

(12) United States Patent
Wilhelmus Thijssen et al.

(10) Patent No.: US 6,412,859 B1
(45) Date of Patent: Jul. 2, 2002

(54) FOLDING ROOF FOR A VEHICLE

(75) Inventors: Edwin Johannes Richardus Wilhelmus Thijssen, Haps; Renatus Arnoldus Teunissen, St. Anthonis; Joseph Petrus Johannes Sanders, Venlo, all of (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/601,608

(22) PCT Filed: Jan. 28, 1999

(86) PCT No.: PCT/NL99/00051
§ 371 (c)(1),
(2), (4) Date: Aug. 3, 2000

(87) PCT Pub. No.: WO99/39932
PCT Pub. Date: Aug. 12, 1999

(30) Foreign Application Priority Data

Feb. 5, 1998 (NL) ............................................. 1008202

(51) Int. Cl.[7] .................................................. B60J 7/12
(52) U.S. Cl. ....................................... 296/219; 296/223
(58) Field of Search ................................. 296/219, 223

(56) References Cited

U.S. PATENT DOCUMENTS

| 1,950,371 A | 3/1934 | Baier | 296/219 |
|---|---|---|---|
| 2,242,844 A | 5/1941 | Baier et al. | 296/224 |
| 2,774,624 A | 12/1956 | Lower | 296/137 |
| 3,002,785 A | 10/1961 | Larche | 296/219 |
| 3,683,993 A | 8/1972 | Perks | 296/224 |
| 3,759,568 A | 9/1973 | Unruh | 296/219 |
| 4,134,611 A | 1/1979 | Craven et al. | 296/137 C |
| 4,830,428 A | 5/1989 | Masuda et al. | 296/219 |
| 5,018,783 A | 5/1991 | Chamings et al. | 296/219 |
| 5,058,939 A | 10/1991 | Miilu | 292/DIG. 5 |
| 5,203,605 A | 4/1993 | Grimm et al. | 296/219 |
| 5,310,241 A | 5/1994 | Omoto et al. | 296/219 |
| 5,820,206 A | 10/1998 | Smith | 296/219 |
| 5,836,644 A | * 11/1998 | Smith | 296/219 |

FOREIGN PATENT DOCUMENTS

| CH | 201483 | 5/1930 | |
| DE | 558031 | 8/1932 | |
| DE | 643380 | 4/1937 | |
| EP | 603834 A1 | 6/1994 | |
| FR | 1003972 | 3/1952 | |
| FR | 1345216 | 10/1963 | ................. 296/224 |
| GB | 323065 | 12/1929 | ................. 296/224 |
| GB | 1539906 | 2/1979 | |
| JP | 02-208125 | 8/1990 | |

* cited by examiner

*Primary Examiner*—Dennis H. Pedder
(74) *Attorney, Agent, or Firm*—Westman, Champlin & Kelly, P.A.; S. Koehler (57) ABSTRACT

A folding roof for a vehicle having an opening in its fixed roof comprises a frame to be mounted in the opening, which frame comprises a passage opening and a flexible cover for selectively closing or releasing the opening. A control beam which is attached to the opening side of the cover, is guided in guide rails at its lateral ends. A driving mechanism is connected to the control beam and selectively moves the control beam for opening or closing the folding roof. A push-off element can come into engagement with the frame when the control beam approaches the closed position. A transmission mechanism positioned between the push-off element and the drive mechanism pulls the control beam to the closed position with increased driving force during the last part of the closing movement. The push-off element is provided laterally of the control beam and co-operates with the stationary guide rails.

19 Claims, 9 Drawing Sheets fig.1 fig.2 fig.3 fig. 4 fig. 5 fig.8 fig.9

FIG. 10

FOLDING ROOF FOR A VEHICLE

BACKGROUND OF THE INVENTION

The present invention relates to a folding roof for a vehicle according to the preamble of the independent claims.

Such a folding roof is known from European patent application No. 0 765 771 of applicant.

SUMMARY OF THE INVENTION.

The object of the present invention is to further improve the prior art folding roof, and in order to accomplish that objective, the invention is characterized by the features as defined in the independent claims.

A folding roof for a vehicle having an opening in its fixed roof comprises a frame to be mounted in the opening, which frame comprises a passage opening and a flexible cover for selectively closing or releasing the opening. A control beam is attached to the opening side of the cover and is guided in guide rails at its lateral ends. A driving mechanism is connected to the control beam and selectively moves the control beam for opening or closing the folding roof. A push-off element can come into engagement with the frame when the control beam approaches the closed position. A transmission mechanism positioned between the push-off element and the drive mechanism pulls the control beam to the closed position with increased driving force during the last part of the closing movement. The push-off element is provided laterally of the control beam and co-operates with the stationary guide rails.

BRIEF DESCRIPTION OF THE DRAWINGS

The invention will now be explained in more detail with reference to the drawings, which schematically show an embodiment of the folding roof according to the invention.

DETAILED DESCRIPTION OF THE ILLUSTRATIVE EMBODIMENTS

Figure 1:
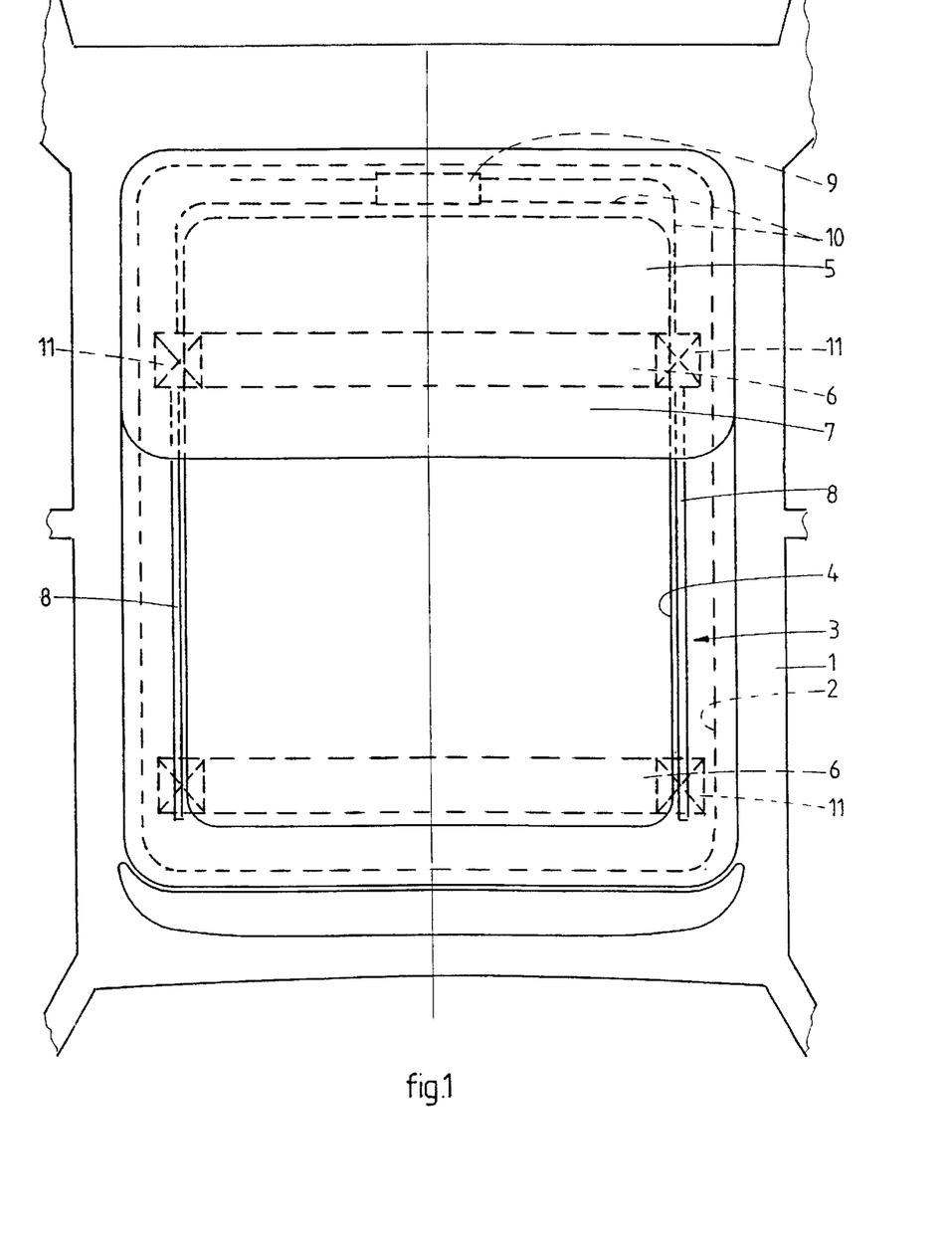
FIG. 1 is a very schematic plan view of the embodiment of the folding roof according to the invention.

The drawing, and in the first instance FIG. 1 thereof, shows a roof 1 of a vehicle, in this case a passenger car, which is provided with an opening 2 for accommodating a folding roof. The folding roof comprises a frame 3, which supports parts of the folding roof and which is arranged for mounting the folding roof in fixed roof 1. Frame 3 defines a passage opening 4, which can be selectively closed or at least partially opened by flexible cover 5. The construction of the flexible cover 5 and the means for folding up same when the roof is being opened may be according to the prior art and will not be explained in more detail herein.

In the present case, a control beam 6 for operating the folding roof is provided on the front side of the flexible cover 5, on which control beam 6 a cover plate 7 is mounted, which is connected to flexible cover 5.

Control beam 6 is guided in guide rails 8 at its lateral ends, which guide rails extend along each side of passage opening 4 in the longitudinal direction of the vehicle. Control beam 6 can be moved forward and backward by drive means comprising a driving element 9 in the form of a crank, an electric motor or the like, and connecting means 10 in the form of pressure-resistant driving cables or the like. Cables 10 drive control beam 6 directly during the larger part of the opening and closing movement. However, in order to be able to pull the flexible covers taut nicely in the closed position of the folding roof, a transmission mechanism 11 is provided between cables 10 and control beam 6, which transmission mechanism functions to pull control beam 6 with increased force to the closed and sealed position during the last part of the closing movement.

FIGS. 2–5 show said transmission mechanism 11 and the parts that co-operate therewith. A lateral end portion of control beam 6 can be distinguished, which is supported, in a manner yet to be shown, in a driving slide 12 which is capable of reciprocating movement in guide rail 8 (not shown) on the respective side of passage opening 4. A subslide 13 comprising an engaging point 14 for the cables 10 (not shown) co-operates with said driving slide 12. Driving slide 12 and subslide 13 are interconnected in such a manner that they move as a unit during the larger part of the opening and closing movement, whilst driving slide 12 is locked with respect to guide rail 8 and subslide 13 moves with respect to driving slide 12 during the final part of the closing movement and the first part of the opening movement, whereby subslide 13 drives the control beam 6 via transmission mechanism 11 during said movement relative to each other.

Figure 6:
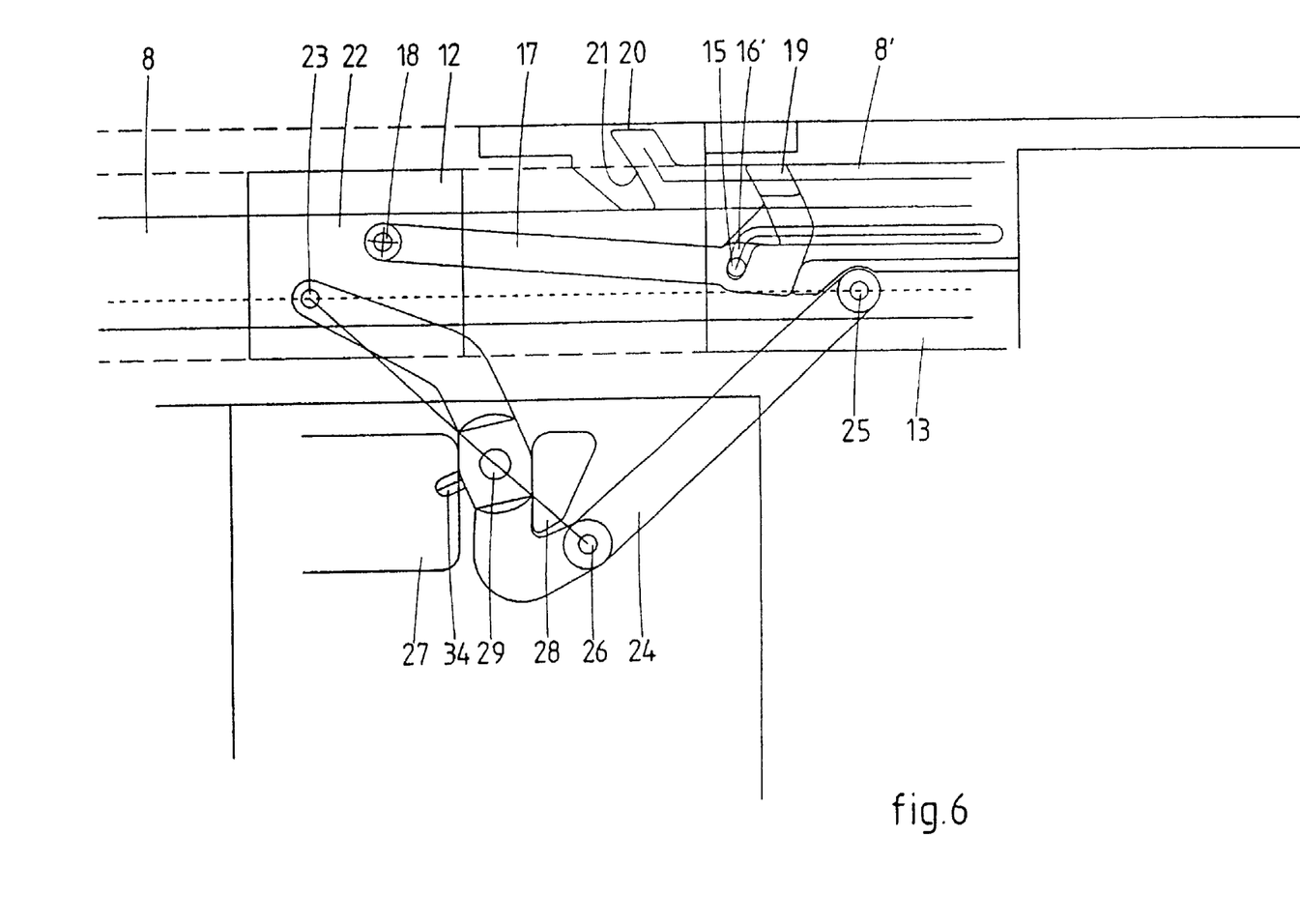
FIGS. 6–9 are views of that which is shown in FIG. 5, showing four different positions thereof.

A locking element in the form of a pin 15 which engages in an oblique slot portion 16' of a slot 16 in subslide 13 is provided for the purpose of interconnecting slides 12 and 13 as a unit. Pin 15 is provided near the free ends of an arm 17 which is pivotally connected to driving slide 12 by means of a vertical pivot 18. While driving slide 12 and subslide 13 are fixedly interconnected, pin 15 is positioned at the end of the oblique slot portion 16', whilst arm 17 is prevented from pivoting about pivot 18 by a cam or nose 19 provided on the free end of arm 17, which abuts against a flange 8' of guide rail 8 (FIG. 6). Thus, driving slide 12 and subslide 13 are rigidly interconnected in longitudinal direction.

The locking engagement by locking element 15 can be released by means of the cam 19 that is present on the free end of arm 17, which cam 19 can enter into the cavity 20 formed in guide rail 8. Cam 19 is forced into cavity 20 by a catch element 21 projecting into the path of cam 19, which catches cam 19 and, because of its sloping position, guides said cam into cavity 20. Another effect of said sloping position is that the driving slide 12 which is connected to arm 17 is gradually stopped, because the cam 19 present on arm 17 continues to move forward slightly, and driving slide 12 will not come to a standstill until cam 19 fully engages in cavity 20, therefore. In this manner, the driving slide is prevented from slamming to a standstill.

The lateral movement of arm 17 caused by cam 19 engaging into cavity 20 not only locks driving slide 12 in position with respect to guide rail 8, but it also causes the locking engagement between driving slide 12 and subslide 13 to be released, since the pin 15 present on arm 17 moves from the oblique slot portion 16 into the slot portion 16' that extends in the longitudinal direction of guide rail 8, as a result of which subslide 13 can move relative to driving slide 12, due to the fact that pin 15 has moved into slot portion 16'. Arm 17 comprising cam 19 thus functions as a releasing element for locking element/pin 15, and also as a locking element for driving slide 12, and thus as a push-off element for transmission mechanism 11. That is, the engagement between cam 19 and cavity 20 makes it possible to transmit the required push-off force to guide rail 8 via cam 9, which enables the transmission mechanism to produce a speed-reducing and thus force-increasing effect.

The transmission mechanism 11 according to the invention comprises a triangular construction with a first leg 22, which is pivotally connected to driving slide 12 by means of a vertical pivot 23, and a second leg 24, which is pivotally connected to subslide 13 by means of a vertical pivot 25. Legs 22 and 24 are pivoted together by means of a pivot 26 at their ends remote from pivots 23, 25. In this manner, a triangular construction having a variable base is formed, because vertical pivot 25 on subslide 13 is capable of movement with respect to pivot 23 on driving slide 12. Movement of subslide 13 with respect to driving slide 12 thus causes the triangle to change its form, to the effect that the angle between legs 22 and 24 will be changed and the top of the triangle will shift relative to the angular point formed by pivot 23.

The triangular construction of the transmission mechanism 11 is in driving engagement with control beam 6 in that first leg 22 is accommodated between upright walls 27 and 28 on control beam 6, between which walls 27 and 28 first leg 22 extends in abutting relationship therewith. The shape of leg 22 is thereby such that the points of engagement between first leg 22 and walls 27, 28 can move in a direction transversely to guide rails 8 while the triangular construction is changing its form, so as not to oppose said deformation. An imaginary line through the points of engagement between first leg 22 and walls 27 and 28 intersects the imaginary line between pivots 23 and 26 in constantly the same point of intersection 29, at least approximately so. Said imaginary line between the points of engagement of first leg 22 to walls 27 and 28 constantly extends parallel to guide rail 8 thereby. This gives the transmission great stability.

The transmission ratio of transmission mechanism 11 can be selected and varied during the design phase by varying the dimensions of the triangular construction and suitably selecting the point of engagement between the triangular construction and the control beam 6. In the illustrated embodiment, the triangle of the triangular construction is an isosceles triangle, since the distance between pivots 23 and 26 of first leg 22 equals the distance between pivots 25 and 26 of second leg 24. In principle, the effective lengths of legs 22 and 24 may also be mutually divergent.

Figures 2, 3:
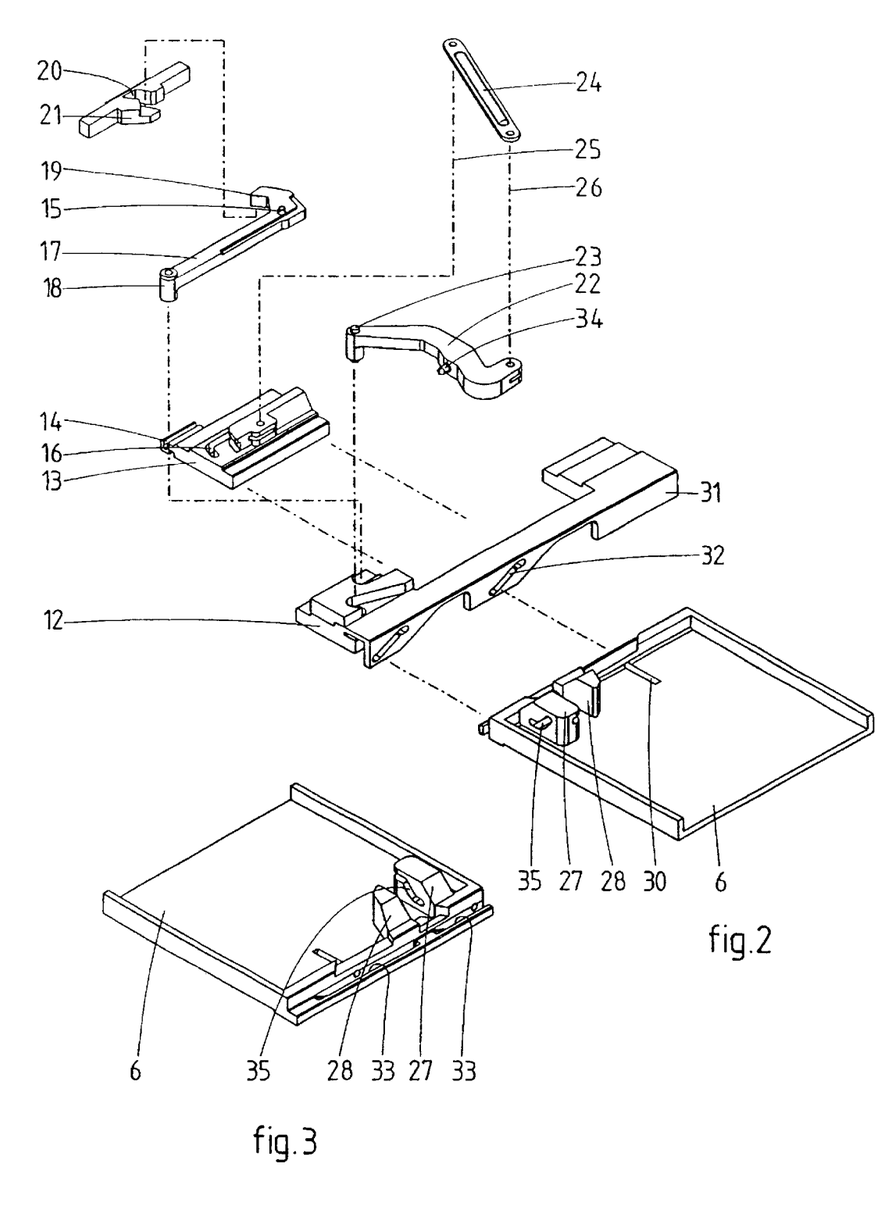
FIG. 2 is a larger-scale, perspective exploded view according to arrow II in FIG. 1, wherein the parts of a transmission mechanism for operating the folding roof are shown.
FIG. 3 shows the part of the control beam of FIG. 2 in a position turned 180° about a vertical axis.
Figure 4:
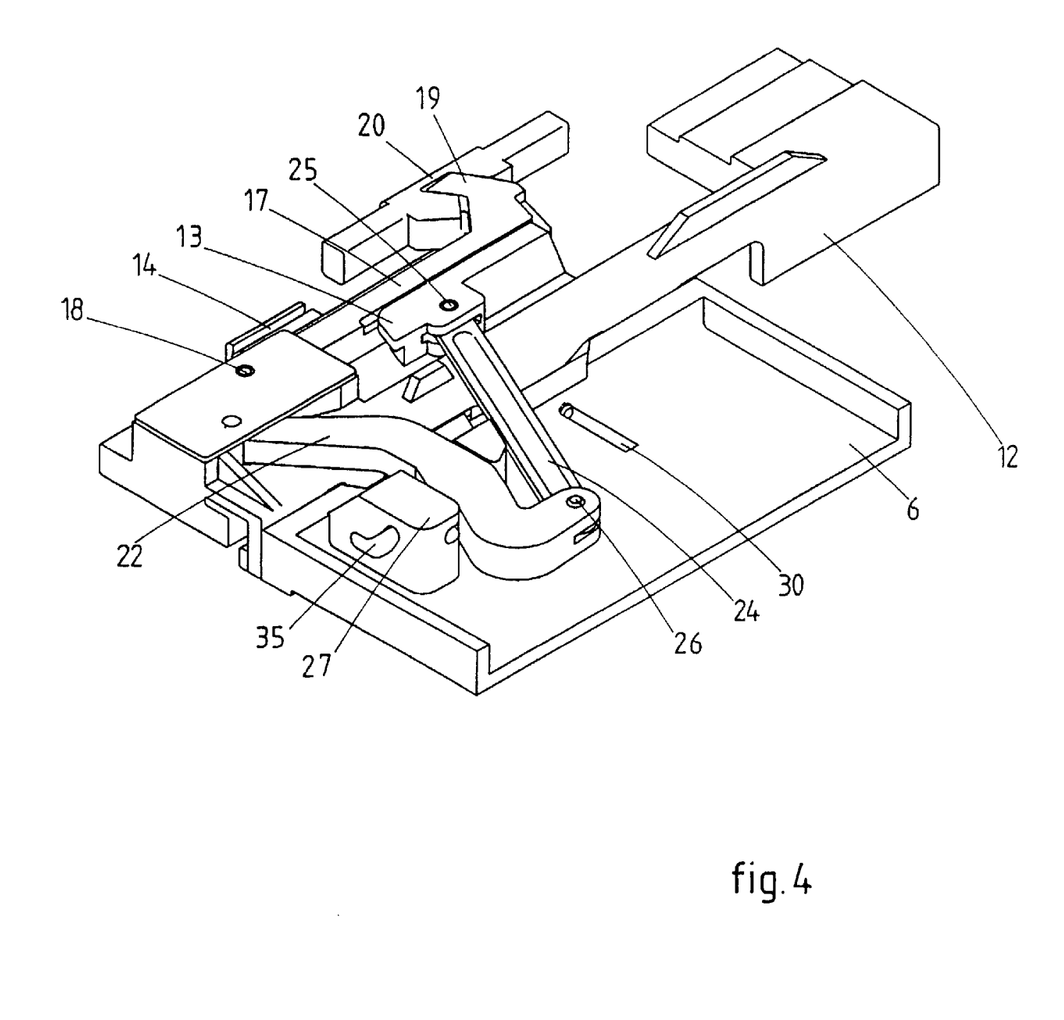
FIG. 4 is a larger-scale view of the parts shown in FIG. 2, but in assembled condition.
Figure 5:
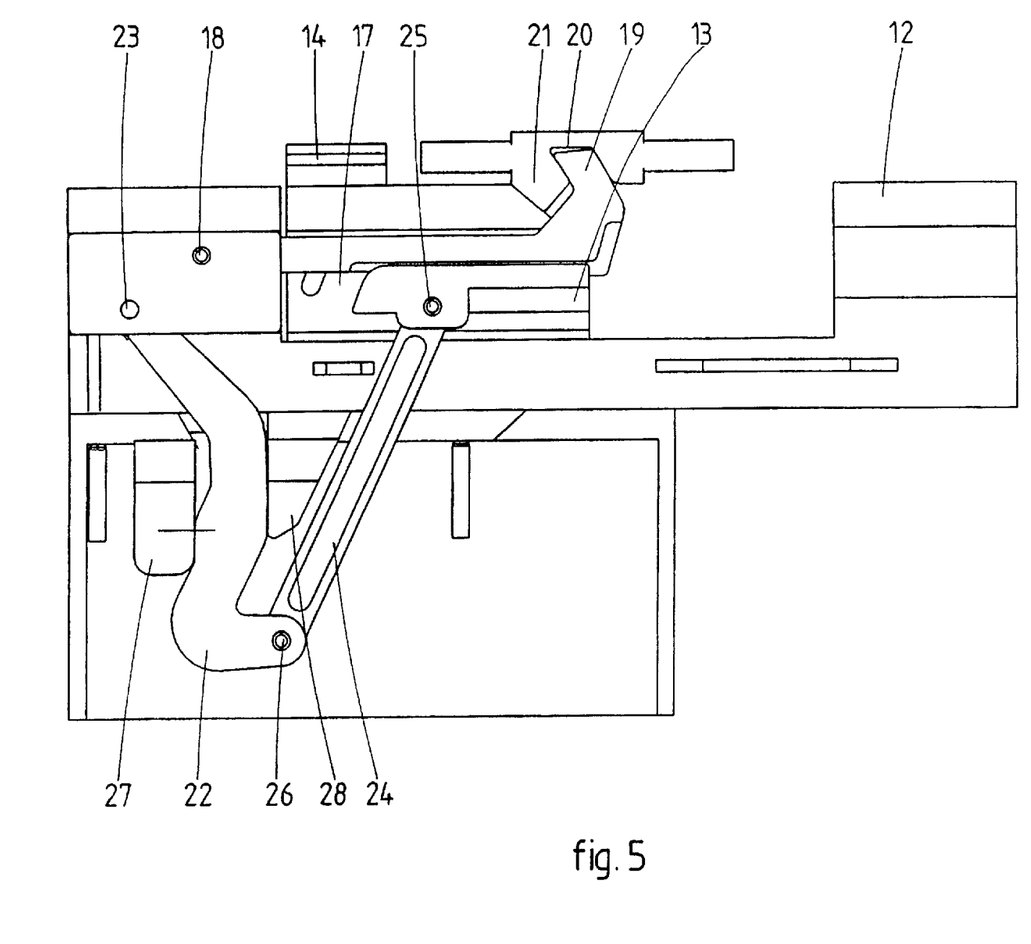
FIG. 5 is a plan view of that which is shown in FIG. 4.
Figure 10:
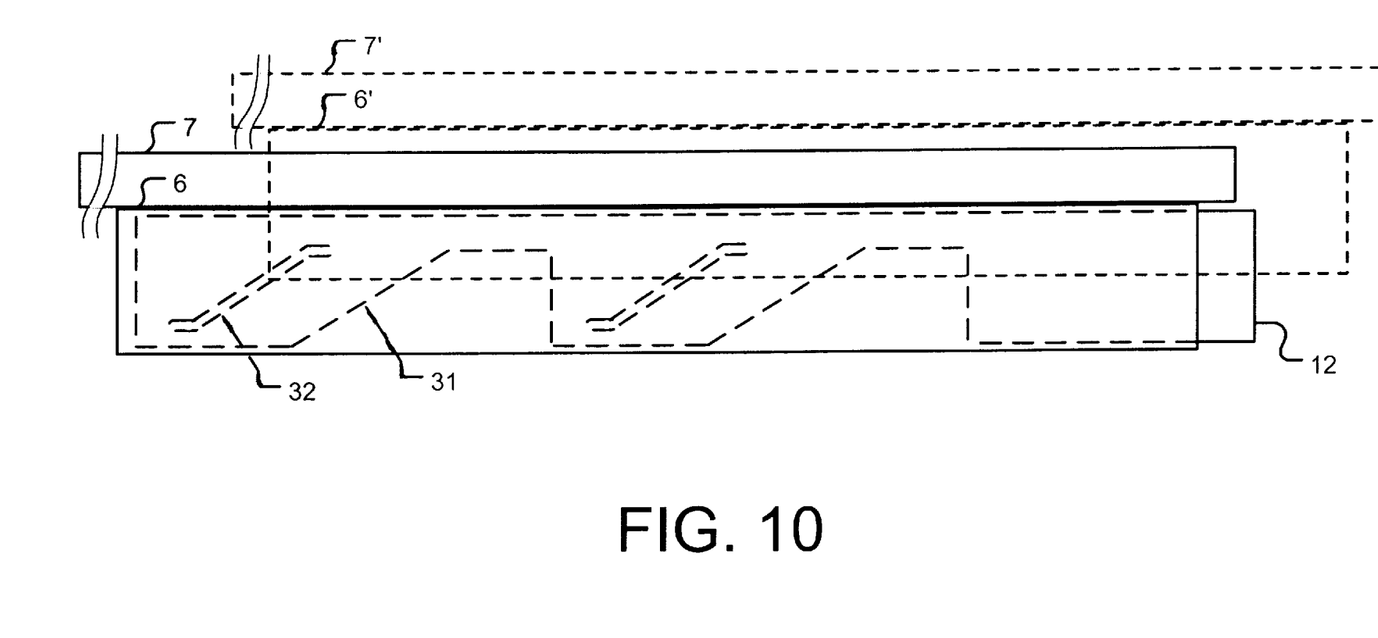
FIG. 10 is a schematic illustration of a cover plate and control beam adjusted in a vertical direction together according to one embodiment of the present invention.

As already mentioned before, control beam 6 is connected to driving slide 12 in a vertically adjustable manner. This is done in order to move cover plate 7, which is fixedly connected (as schematically illustrated in FIG. 10) to control beam 6 in the present embodiment, in a vertical direction (together with control beam 6 as shown in FIG. 10) during the final part of the closing movement and the first part of the opening movement, so as to have cover plate 7 move into sealing engagement with a mating sealing surface on frame 3 of the folding roof when the folding roof is being closed. The connection between the control beam 6 and the respective driving slide 12 takes place via pin-slot connections comprising pins which are secured to control beam 6 (only cavities 30 for receiving the pins are shown in the drawing of FIGS. 2 and 3) and slots 32 which are formed in a flange 31 of driving slide 12, which extends downwards along the inner side of guide rails 8. Slots 32 comprise horizontal locking portions at their ends and an oblique portion extending therebetween, which functions to adjust control beam 6 in a vertical direction during the movement of control beam 6 with respect to driving slide 12 when transmission mechanism 11 is operative. Accordingly, the vertical adjustment of control beam 6 and of cover plate 7 is controlled by the transmission mechanism 11 of the driving mechanism. Control beam 6 is locked in position with respect to driving slide 12, in the direction transversely to the guide rails, because the portions of flange 31 in which slots 32 are present engage in openings 33 in the side wall of control beam 6 (see FIG. 3) in a vertically adjustable manner.

The movement in vertical direction of control beam 6 with respect to leg 22 of the triangular construction is made possible in that first leg 22 is in engagement with the front upright wall 27 via a pin-slot connection comprising a pin 34 which is formed on first leg 22 and a partially obliquely extending slot 35 which is formed in wall 37. Said slot therefore makes it possible for leg 22 to be supported in vertical direction and for control beam 6 and front leg 22 to move in lateral direction and in vertical direction relative to each other.

FIGS. 6–9 illustrate the operation of the driving mechanism and of the transmission mechanism 11 for control beam 6.

FIG. 6 illustrates the position of transmission mechanism 11 wherein control beam 6 is driven directly by the cables 10. The base of the triangular construction between pivots 23 and 25 is locked thereby, because driving slide 12 and subslide 13 are interconnected as a unit. This has been effected by means of a pin 15 which acts as a locking element, which pin engages in the oblique slot portion 16 of the subslide, whilst the arm 17 on which pin 15 is present abuts against a flange of the guide rail 8 via cam 19 on arm 17. Transmission mechanism 11 will remain inoperative as long as arm 17 is prevented from making a pivoting movement, so that a direct transmission will be effected via the rigid triangular construction.

Figure 7:
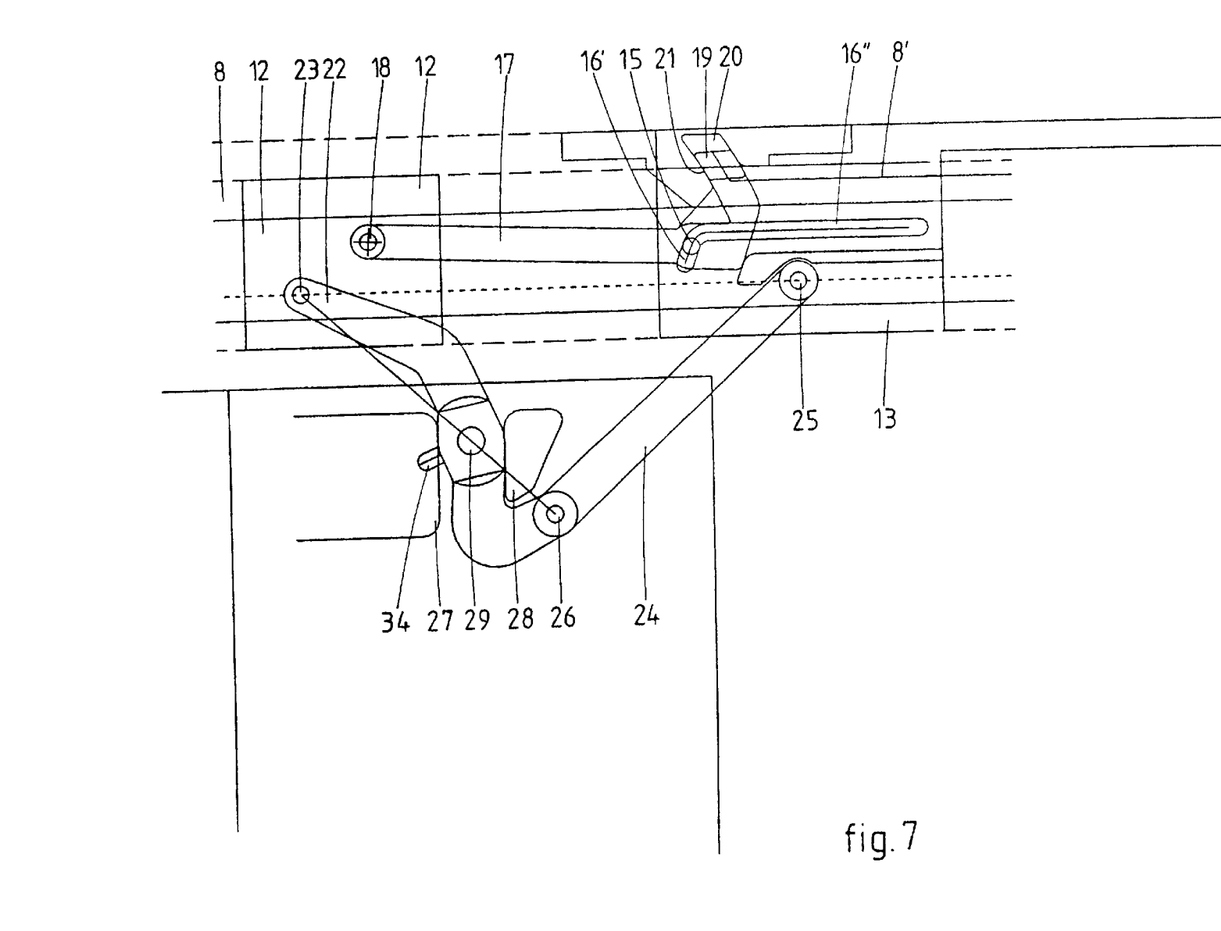

FIG. 7 shows the position of control beam 6 of the folding roof, wherein subslide 13 has been moved so far to the front by the cable 10 in question that cam 19 on arm 17 hooks behind catch element 21 of guide rail 8, and cam 19 is forced into cavity 20 as a result of the sloping configuration of catch element 21. As a result of this lateral movement of cam 19, arm 17 will pivot about pivot 18, causing pin 15 near cam 19 on arm 17 to move through oblique slot portion 16' in the direction of parallel slot portion 16".

Figure 8:
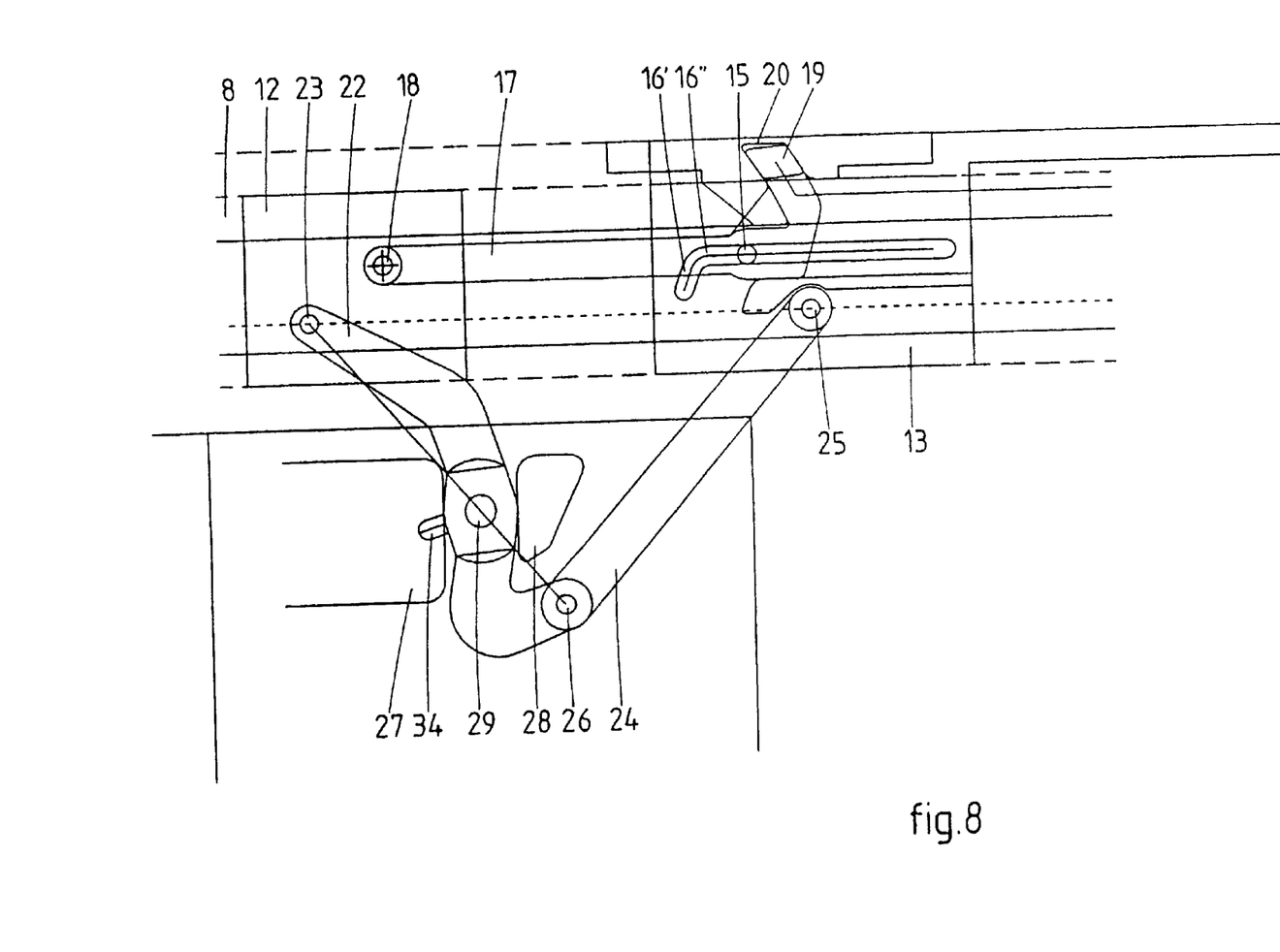

FIG. 8 shows the position in which cam 19 fully engages in cavity 20, and in which pin 15 on arm 17 has reached slot portion 16". As soon as pin 15 has landed in said slot portion 16", cam 19 is locked in position in cavity 20 in that arm 17 is prevented from pivoting about pivot 18 as a result of pin 15 engaging in slot portion 16'. On the other hand, movement of subslide 13 with respect to driving slide 12 is allowed in this position, in that pin 15 enables subslide 13 to move with respect to driving slide 12 as a result of the relative movement between pin 15 and slot portion 16". Since driving slide 12 is locked in position via arm 17 as a result of cam 19 engaging in cavity 20, subslide 13 will start to move with respect to driving slide 12 when an additional driving force is exerted via cable 10. Pivot 25 of second leg 24 is moved with respect to pivot 23 of first leg 22 thereby, causing the triangle made up of legs 22 and 24 to change its form and first leg 22 to make a pivoting movement about pivot 23. This pivoting movement produces a component of motion of point of intersection 29 on first leg 22 in a direction parallel to guide rail 8, which results in movement of control beam 6 via upright wall 28. The magnitude of the movement of control beam 6 as compared to the movement of subslide 13 depends on the dimensions of the triangular construction.

Figure 9:
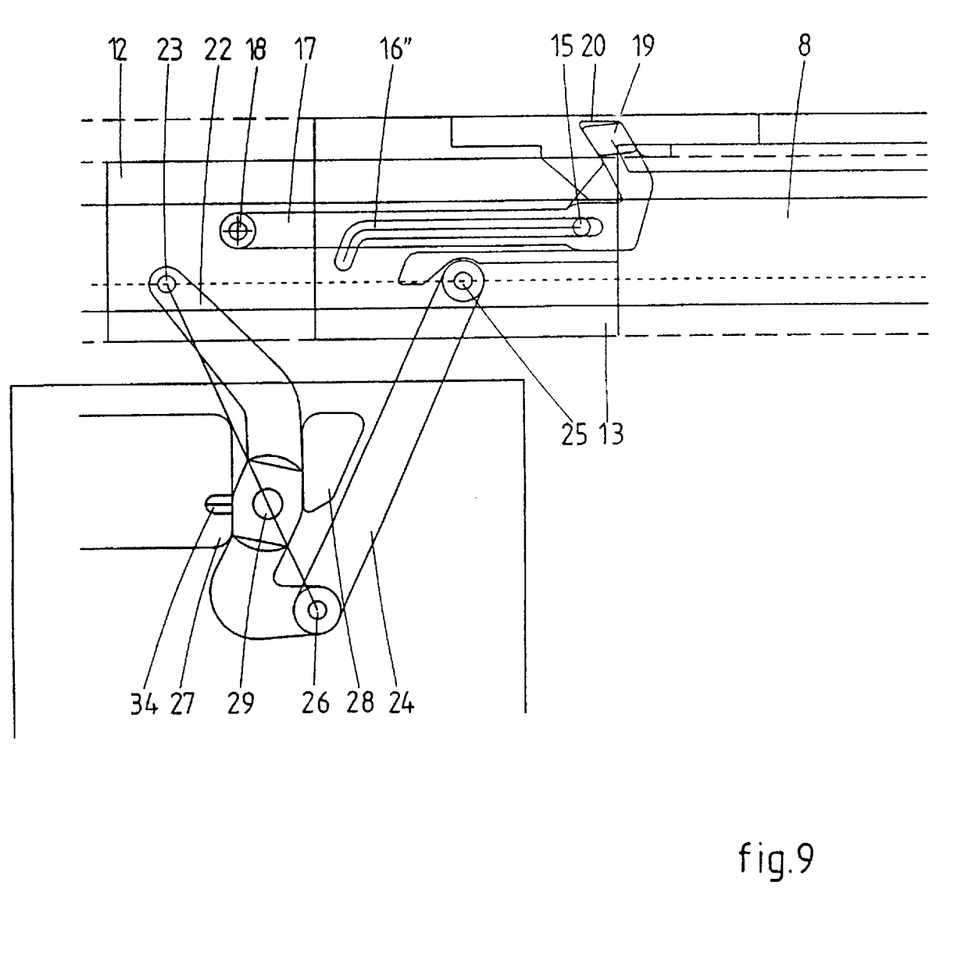

In FIG. 9, the folding roof occupies its most forward, entirely closed and sealed position, in which subslide 13 has reached its most forward position. In this position, first leg 22 is in engagement with the upright walls 27 and 28 of control beam 6 in such a manner that a force being exerted on leg 22 from control beam as a result of the stretching force in cover 5 is absorbed properly by legs 22 and 24, subslide 13 and eventually cables 10 and driving element 9. Control beam 6 is thus locked in its most forward position by the retaining force which is exerted by the cables and the driving element, which retaining force is increased by the transmission from transmission mechanism 11.

The opening of the folding roof takes place in the reverse manner, so that a more detailed description thereof need not be provided.

From the foregoing it will be apparent that the invention provides a folding roof for a vehicle which comprises a transmission mechanism which excels by its stability and by its small overall height. This is made possible, among other things, by the triangular construction and the integration of the vertical adjusting mechanism of the cover plate. Also the fact that the control beam is supported in a lateral flange of the slide contributes towards said small overall height. Since the push-off/locking element of the transmission mechanism is laterally accommodated in the guide rail, at an inaccessible position, without projecting from the front side of the control beam, the risk of incorrect operation as a result of the push-off/locking mechanism being operated by hand is excluded. The entire mechanism operates without springs and with a constructionally constrained guidance, thus ensuring a highly reliable operation.

What is claimed is:

1. A folding roof for a vehicle having an opening in a fixed roof, comprising:
   a frame to be mounted in said opening, which frame comprises a passage opening and guide rails extending in a longitudinal direction of the vehicle on opposite sides of the passage opening;
   a flexible cover for selectively closing or opening said passage opening;
   a control beam attached to an opening side of said cover, which is guided in guide rails at its lateral ends;
   a driving slide guided in each guide rail having a push-off element that can come into engagement with said frame when the control beam approaches the closed position;
   a transmission mechanism positioned between each of said push-off element and said driving slide, which functions to pull the control beam to the closed position with increased driving force during the last part of the closing movement, wherein the transmission mechanism comprises a triangular construction with a variable base on said driving slide and a point of engagement on said control beam, which shifts in a direction parallel to the guide rail upon deformation of said triangular construction.

2. The folding roof according to claim 1, wherein each of said transmission mechanisms is provided with a locking mechanism to prevent operation of the transmission mechanism as long as the locking mechanism is operative, and also with a releasing mechanism for releasing the locking engagement of the locking mechanism and activating the transmission mechanism when the push-off element is in engagement with the frame.

3. The folding roof according to claim 2, wherein a first leg of said triangular construction pivotally engages said driving slide, and wherein a second leg of said triangular construction is pivotally and movably connected to said driving slide, the latter being under the control of said locking and releasing mechanism to the driving slide.

4. The folding roof according to claim 3, wherein the pivotable and movable second leg of the triangular construction of said transmission mechanism is provided on a subslide of said driving slide.

5. The folding roof according to claim 4, wherein said locking and releasing mechanism is provided with a pin-slot connection between said driving slide and said subslide, wherein the slot comprises a locking portion, which extends at an angle to said guide rail, and a releasing portion, which extends parallel to said guide rail, whilst the pin is provided on a part which is connected to said push-off element.

6. The folding roof according to claim 5, wherein the part supporting said pin and being connected to said push-off element is made up of an arm which is connected to said push-off element, which arm is pivotally connected to said driving slide by a vertical pivot.

7. The folding roof according to claim 1, wherein said push-off element is provided with a laterally movable cam, which is capable of engaging in a cavity which is formed in said guide rail for locking said driving slide against movement with respect to said guide rail.

8. The folding roof according to claim 7, wherein the cam of said push-off element and the cavity in the guide rail point obliquely forwards in the closing direction of the roof.

9. The folding roof according to claim 7, wherein the cam of said push-off element and the pin of said locking and releasing mechanism are provided near the free end of the arm.

10. The folding roof according to claim 3, wherein the first leg, which is pivotally connected to said driving slide, is in driving engagement with the control beam in the longitudinal direction of said guide rail at a location between its ends.

11. The folding roof according to claim 10, wherein said first leg is shaped to remain in stable engagement with said control beam during its pivoting movement.

12. The folding roof according to claim 11, wherein said first leg is retained between two upright walls, which extend at least approximately transversely to the guide rails, whilst the first leg is in engagement with the walls via a pin-slot connection, in such manner as to allow relative movement in a direction parallel to said walls.

13. The folding roof according to claim 1 comprising a vertically adjustable, rigid cover plate, which is capable of engaging the frame via sealing means in the closed position of the folding roof, and a height adjustment mechanism for said cover plate, which can be operated when the folding roof is being opened and closed, wherein said height adjustment mechanism is mounted on the driving slide which is guided in said guide rails, to which said cover plate is connected.

14. The folding roof according to claim 13, wherein said cover plate is fixed to said control beam, and wherein said control beam is connected to said driving slides via said height adjustment mechanism and wherein said control beam can be adjusted in vertical direction together with said cover plate.

15. The folding roof according to claim 13, wherein said transmission mechanism engages said control beam in a vertically adjustable manner.

16. The folding roof according to claim 12, wherein one leg of said transmission mechanism and said control beam are in engagement with each other via a pin-slot connection comprising a vertically extending slot.

17. A folding roof for a vehicle having an opening in a fixed roof, comprising:

a frame to be mounted in said opening, which frame comprises a passage opening and guide rails extending in a longitudinal direction of the vehicle on opposite sides of the passage opening;

a flexible cover for selectively closing or opening said passage opening;

a control beam attached to an opening side of said cover, which is guided in guide rails at its lateral ends;

a vertically adjustable, rigid cover plate, which is mounted on said control beam, which is capable of sealing engagement with the frame in the closed position of the folding roof; and a height adjustment mechanism for each side of said cover plate, which can be operated when the folding roof is being opened and closed, wherein each of said height adjustment mechanisms is mounted on a corresponding driving slide which is guided in one of said guide rails, wherein said cover plate is fixed to said control beam, wherein said control beam is connected to said driving slides via said height adjustment mechanisms and wherein said control beam can be adjusted in a vertical direction together with said cover plate.

18. The folding roof according to claim 17, wherein each of said height adjustment mechanism comprises at least two pin-slot connections between said control beam and each driving slide.

19. A folding roof for a vehicle having an opening in a fixed roof, comprising:

a frame to be mounted in said opening, which frame comprises a passage opening and stationary guide rails extending in a longitudinal direction of the vehicle on opposite sides of the passage opening;

a flexible cover for selectively closing or opening said passage opening;

a control beam attached to an opening side of said cover, which is guided in guide rails at its lateral ends;

driving means which are connected to said control beam for the purpose of moving said control beam for opening or closing the folding roof;

a push-off element provided at each lateral end of said control beam and cooperating with said stationary guide rails, wherein said push-off elements can come into engagement with said stationary guide rails when the control beam approaches the closed position; and a transmission mechanism positioned between said push-off element and said driving means, which functions to pull the control beam to the closed position with increased driving force during the last part of the closing movement.

\* \* \* \* \*